US011361774B2

(12) United States Patent
Mendel et al.

(10) Patent No.: US 11,361,774 B2
(45) Date of Patent: Jun. 14, 2022

(54) MULTI-SIGNAL DETECTION AND COMBINATION OF AUDIO-BASED DATA TRANSMISSIONS

(71) Applicant: LISNR, Cincinnati, OH (US)

(72) Inventors: Oz Mendel, Piedmont, CA (US); William Knauer, Bellevue, KY (US)

(73) Assignee: LISNR, Cincinnati, OH (US)

( * ) Notice: Subject to any disclaimer, the term of this patent is extended or adjusted under 35 U.S.C. 154(b) by 12 days.

(21) Appl. No.: 16/746,134

(22) Filed: Jan. 17, 2020

(65) Prior Publication Data
US 2021/0225382 A1 Jul. 22, 2021

(51) Int. Cl.
G10L 19/008 (2013.01)
H04R 3/00 (2006.01)
H04R 1/40 (2006.01)

(52) U.S. Cl.
CPC .................. *G10L 19/008* (2013.01)

(58) Field of Classification Search
CPC ... G10L 19/005; G10L 19/008; G10L 19/018; G10L 19/20; G10L 19/167; G10L 19/02; G10L 19/0212; H04B 11/00; H04B 1/16; G06F 3/165; G06F 21/34; G06F 21/35; H04N 21/42203; H04W 4/06; H04W 84/18; H04W 4/80; H04W 74/0866; H04W 92/18
USPC .................. 704/500–504; 700/94; 381/17–23
See application file for complete search history.

(56) References Cited

U.S. PATENT DOCUMENTS

| 6,931,134 | B1 | 8/2005 | Waller, Jr. et al. |
| 9,299,364 | B1 | 3/2016 | Pereira et al. |
| 9,621,984 | B1* | 4/2017 | Chu .................. G06F 3/165 |
| 10,079,028 | B2* | 9/2018 | Anushiravani ....... G10L 21/057 |
| 2002/0147594 | A1 | 10/2002 | Duncan |
| 2003/0212549 | A1 | 11/2003 | Steentra et al. |
| 2005/0255843 | A1 | 11/2005 | Hilpisch et al. |
| 2007/0094009 | A1* | 4/2007 | Ryu ..................... G10L 19/005 704/200.1 |
| 2007/0127311 | A1 | 6/2007 | Garcia-Osuna et al. |

(Continued)

FOREIGN PATENT DOCUMENTS

JP 2019049685 A 3/2019

OTHER PUBLICATIONS

International Search Report and Written Opinion for International Application No. PCT/US2021/013637, dated Apr. 9, 2021, (28 pages).

(Continued)

*Primary Examiner* — Leshui Zhang
(74) *Attorney, Agent, or Firm* — Norton Rose Fulbright US LLP

(57) ABSTRACT

Methods and systems for detecting and combining audio transmissions containing data are provided. In one embodiment, a method is provided that includes receiving multiple audio signals from multiple receivers. An audio transmission may be detected in a first subset of the audio signals and the audio transmission may contain data. A second subset of the audio signals may be identified with the strongest magnitude of the audio transmission. Portions of the second subset of the audio signals may then be combined to generate a combined audio transmission signal and the combined audio transmission signal may be decoded for further processing.

20 Claims, 10 Drawing Sheets

(56) References Cited

U.S. PATENT DOCUMENTS

| | | | |
|---|---|---|---|
| 2008/0281586 A1* | 11/2008 | Florencio | G10L 25/87 704/214 |
| 2008/0304360 A1* | 12/2008 | Mozer | H04B 11/00 367/117 |
| 2012/0262531 A1 | 10/2012 | Sylvain | |
| 2013/0183944 A1* | 7/2013 | Mozer | H04L 12/282 455/414.1 |
| 2013/0262198 A1 | 10/2013 | Chung | |
| 2014/0172141 A1 | 6/2014 | Mangold | |
| 2014/0192622 A1* | 7/2014 | Rowe | G01S 5/28 367/117 |
| 2014/0364075 A1* | 12/2014 | Sullivan | H04W 48/16 455/166.1 |
| 2015/0113094 A1* | 4/2015 | Williams | H04N 21/8106 709/217 |
| 2016/0148618 A1* | 5/2016 | Huang | G10L 19/167 381/2 |
| 2016/0269128 A1 | 9/2016 | Gautama et al. | |
| 2016/0323668 A1 | 11/2016 | Abraham et al. | |
| 2017/0026740 A1 | 1/2017 | Kirsch et al. | |
| 2017/0070250 A1* | 3/2017 | Kundmann | H04B 1/16 |
| 2017/0085112 A1 | 3/2017 | Leabman | |
| 2017/0111738 A1 | 4/2017 | Murray et al. | |
| 2017/0279542 A1* | 9/2017 | Knauer | H04R 1/225 |
| 2017/0329002 A1 | 11/2017 | Koerber et al. | |
| 2018/0035222 A1* | 2/2018 | Anderson | G10L 19/008 |
| 2018/0132298 A1 | 5/2018 | Birnam et al. | |
| 2018/0143292 A1 | 5/2018 | Przybyla et al. | |
| 2018/0269554 A1 | 9/2018 | Sanford | |
| 2019/0090052 A1* | 3/2019 | Radmanesh | H04R 3/005 |
| 2019/0141311 A1 | 5/2019 | Lee et al. | |
| 2019/0222070 A1 | 7/2019 | Leabman | |
| 2020/0227039 A1* | 7/2020 | Liu | G10L 15/22 |

OTHER PUBLICATIONS

Cho et al., "An acoustic data transmissions system based on audio data hding: method and performance evaluation." EURASIP Journal on Aidio, Speech, and Music Processing Jan. 2015(2015); 1-14. Apr. 18, 2015; retrieved on Mar. 13, 2021 from <https://link/springer.com/article/10.1186/s13636-015-0053-x>.

International Search Report and Written Opinion corresponding to related International Application No. PCT/US2021/013669, dated Mar. 31, 2021, 18 pages.

International Search Report and Written Opinion corresponding to related International Application No. PCT/US2021/013679, dated Apr. 9, 2021, 10 pages.

Smartavi, "RK*-JDK-ULT", smartavi.com, 2018, retrieved Feb. 22, 2021 from <URD:https://smartavi.com/rk8-hdx-ult/>, 6 pages.

* cited by examiner

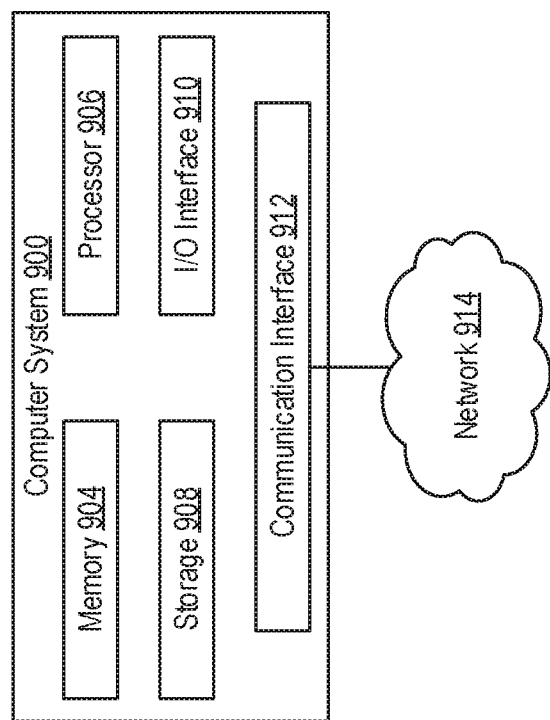

MULTI-SIGNAL DETECTION AND COMBINATION OF AUDIO-BASED DATA TRANSMISSIONS

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative methods and systems for detecting and combining audio transmissions that contain data. In a first aspect, a method is provided comprising receiving multiple audio signals detected by multiple receivers and detecting a first audio transmission in a first subset of the audio signals, the first subset of the audio signals being received by a first subset of the receivers, and the first audio transmission containing first data for transmission using the first audio transmission. The method may further include identifying a second subset of the audio signals that correspond to a second subset of the receivers with strongest magnitudes of the first audio transmission and combining portions of the second subset of the audio signals corresponding to at least a first portion of the first audio transmission to generate a first combined audio transmission signal. The method may still further include decoding the at least a portion of the first combined audio transmission signal to extract the first data.

In a second aspect according to the first aspect, the method further comprises detecting a second audio transmission in a third subset of the audio signals, the third subset of the audio signals being received by a third subset of the receivers, and the second audio transmission containing second data for transmission using the second audio transmission and identifying a fourth subset of the audio signals corresponding to a fourth subset of the receivers with strongest magnitudes of the second audio transmission. The method may still further include combining portions of the fourth subset of the audio signals corresponding to at least a first portion of the second audio transmission to generate a second combined audio transmission signal and decoding the at least a portion of the second combined audio transmission signal to extract the second data.

In a third aspect according to the second aspect, the second audio transmission is detected within one second of detecting the first audio transmission.

In a fourth aspect according to any of the second and third aspects, the first audio transmission and the second audio transmission are transmitted using the same audio carrier channel.

In a fifth aspect according to any of the second through fourth aspects, the fourth subset of the receivers does not include any of the second subset of the receivers.

In a sixth aspect according to any of the first through fifth aspects, identifying the second subset of the receivers further comprises determining, for each audio signal of the first subset of the audio signals, a time difference between when the first audio transmission is detected earliest in a first audio signal of the first subset of the audio signals and when the first audio transmission is detected in the remaining audio signals of the first subset of the audio signals. Identifying the second of the receivers may still further comprise identifying the second subset of the audio signals as comprising the first audio signal and the audio signals of the first subset of the audio signals with the shortest time differences.

In a seventh aspect according to the sixth aspect, combining the portions of the second subset of the audio signals comprises adjusting timing information of each audio signal of the second subset of the audio signals based on a time difference of the audio signal.

In an eighth aspect according to any of the sixth and seventh aspects, the second subset of the audio signals are identified as the audio signals of the first subset of the audio signals with time differences less than a predetermined threshold.

In a ninth aspect according to the eighth aspect, the predetermined threshold is less than or equal to 50 milliseconds.

In a tenth aspect according to any of the first through ninth aspects, combining the portions of the second subset of the audio signals further comprises identifying, for each audio signal of the second subset of the audio signals, the portion of the audio signal corresponding to the first portion of the first audio transmission.

In an eleventh aspect according to any of the first through tenth aspects, detecting the first audio transmission in the first subset of the audio signals comprises detecting a second portion of the first audio transmission in the first subset of the audio signals, the first portion of the first audio transmission including a predetermined audio sequence.

In a twelfth aspect according to the eleventh aspect, the second portion of the first audio transmission is a preamble indicating the start of the first audio transmission.

In a thirteenth aspect, a system is provided that includes a processor and a memory. The memory may store instructions which, when executed by the processor, cause the processor to receive multiple audio signals detected by multiple receivers and detect a first audio transmission in a first subset of the audio signals, the first subset of the audio signals being received by a first subset of the receivers, and the first audio transmission containing first data for transmission using the first audio transmission. The memory may store further instructions which, when executed by the processor, cause the processor to identify a second subset of the audio signals that correspond to a second subset of the receivers with strongest magnitudes of the first audio transmission and combine portions of the second subset of the audio signals corresponding to at least a first portion of the first audio transmission to generate a first combined audio transmission signal. The may store still further instructions which, when executed by the processor, cause the processor to decode the at least a portion of the first combined audio transmission signal to extract the first data.

In a fourteenth aspect according to the thirteenth aspect, the memory stores further instructions which, when executed by the processor, cause the processor to detect a second audio transmission in a third subset of the audio signals, the third subset of the audio signals being received by a third subset of the receivers, and the second audio transmission containing second data for transmission using the second audio transmission and identify a fourth subset of the audio signals corresponding to a fourth subset of the receivers with strongest magnitudes of the second audio transmission. The may store still further instructions which, when executed by the processor, cause the processor to combine portions of the fourth subset of the audio signals corresponding to at least a first portion of the second audio transmission to generate a second combined audio transmission signal and decode the at least a portion of the second combined audio transmission signal to extract the second data.

In a fifteenth aspect according to the fourteenth aspect, the first audio transmission and the second audio transmission are transmitted using the same audio carrier channel.

In a sixteenth aspect according to any of the fourteenth and fifteenth aspects, the fourth subset of the receivers does not include any of the second subset of the receivers.

In a seventeenth aspect according to any of the thirteenth through sixteenth aspects, the memory stores further instructions which, when executed by the processor while identifying the second subset of the receivers, cause the processor to determine, for each audio signal of the first subset of the audio signals, a time difference between when the first audio transmission is detected earliest in a first audio signal of the first subset of the audio signals and when the first audio transmission is detected in the remaining audio signals of the first subset of the audio signals and identify the second subset of the audio signals as comprising the first audio signal and the audio signals of the first subset of the audio signals with the shortest time differences.

In an eighteenth aspect according to the seventeenth aspect, the second subset of the audio signals are identified as the audio signals of the first subset of the audio signals with time differences less than a predetermined threshold.

In a nineteenth aspect according to any of the thirteenth through eighteenth aspects, the memory stores further instructions which, when executed by the processor while combining the portions of the second subset of the audio signals, cause the processor to identify, for each audio signal of the second subset of the audio signals, the portion of the audio signal corresponding to the first portion of the first audio transmission.

In a twentieth aspect, a non-transitory, computer-readable medium is provided storing instructions which, when executed by a processor, cause the processor to receive multiple audio signals detected by multiple receivers and detect a first audio transmission in a first subset of the audio signals, the first subset of the audio signals being received by a first subset of the receivers, and the first audio transmission containing first data for transmission using the first audio transmission. The non-transitory, computer-readable medium may store further instructions which, when executed by a processor, cause the processor to identify a second subset of the audio signals that correspond to a second subset of the receivers with strongest magnitudes of the first audio transmission and combine portions of the second subset of the audio signals corresponding to at least a first portion of the first audio transmission to generate a first combined audio transmission signal. The non-transitory, computer-readable medium may store still further instructions which, when executed by a processor, cause the processor to decode the at least a portion of the first combined audio transmission signal to extract the first data.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 9 illustrates a computing system according to an exemplary embodiment of the present disclosure.

DETAILED DESCRIPTION OF EXAMPLE EMBODIMENTS

Aspects of the present disclosure relate to identification and combination of audio signals containing audio transmissions that are used to transmit data between computing devices. Techniques related to those discussed in the present disclosure are also discussed in U.S. application Ser. No. 16/746,211, filed on Jan. 17, 2020, and titled "DIRECTIONAL DETECTION AND ACKNOWLEDGMENT OF AUDIO-BASED DATA TRANSMISSIONS" and U.S. application Ser. No. 16/746,187, filed on Jan. 17, 2020, and titled "AUDIO TRANSMITTER/RECEIVER ARRAY," the disclosure of which is herein incorporated by reference.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and W-Fi® (e.g., direct Wi-Fi links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
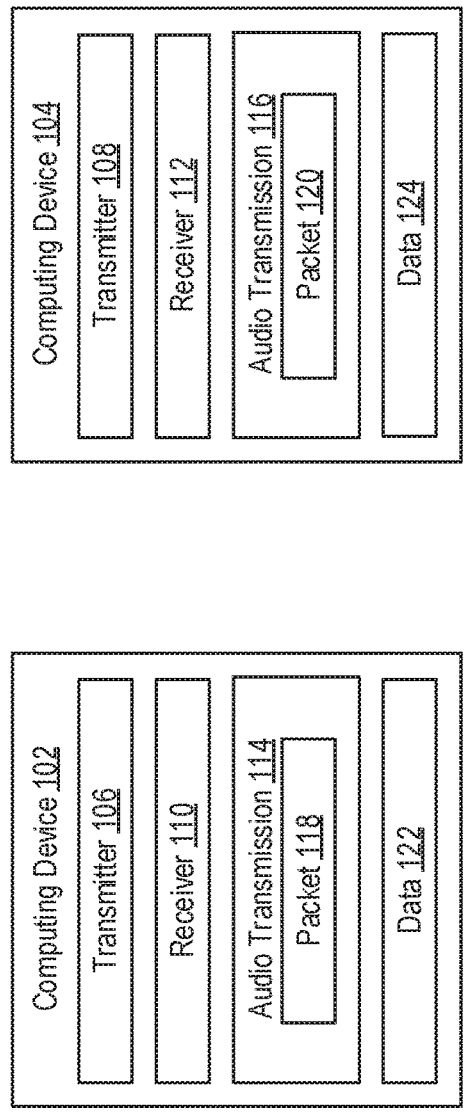
FIG. 1 illustrates a system according to an exemplary embodiment of the present disclosure.

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smartphone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing at least one speaker and at least one microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference and/or distortions that are either not present or less prevalent for data transmissions by electromagnetic signals. For instance, different frequencies utilized by the audio transmission may attenuate differently, causing certain frequencies to appear larger in magnitude when received by another computing device. Further, over longer distances, the magnitude of the audio transmission when received may decrease, reducing the signal-to-noise ratio for the received audio transmission.

Therefore, there exists a need to account for these types of interference with audio transmissions. One solution to this problem is to detect audio transmissions with multiple receivers and to combine the audio signals from the multiple receivers. Certain types of interference (e.g., environmental noise or disruptions) may tend to be uncorrelated between different receivers (e.g., received at different magnitudes, received at different times, and/or not received at certain receivers). By contrast, the contents of the audio transmission received by the multiple receivers may be constant and therefore correlated between the different receivers (e.g., received in the same sequence at slightly different times). Therefore, combining the audio signals from the multiple receivers may increase the relative magnitude of the correlated portions of the audio signals (e.g., the audio transmission) while decreasing the relative magnitude of the uncorrelated portions of the audio signals (e.g., sources of interference). Accordingly, the combined audio signal may have a higher signal-to-noise ratio than the individual audio signals received by the multiple receivers. However, the audio transmission may not be received by all receivers connected to a particular computing device. Therefore, before combining the audio signals, the receivers that received the audio transmission may need to be identified. Also, receivers with lower magnitudes of the audio transmission may be more likely to include noise or other inaccurate symbols (e.g., other audio transmissions) which may reduce the signal-to-noise ratio of the combined audio signals. Therefore, the receivers with the largest magnitude of the audio transmission may need to be identified prior to combining the audio signals.

Figure 2:
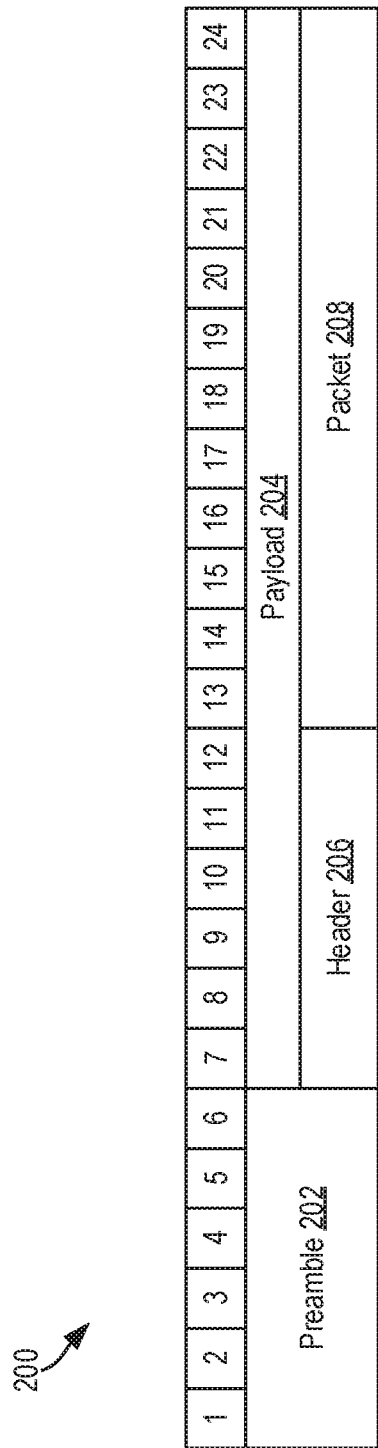
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined frequencies produced at predetermined points of time (e.g., according to a frequency pattern). In certain implementations, the preamble 202 may additionally or alternatively contain frequencies (e.g., a particular predetermined frequency) whose phase differences are altered by predetermined amounts at predetermined points of time (e.g., according to a phase difference pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding frequencies and/or phase differences). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3A:
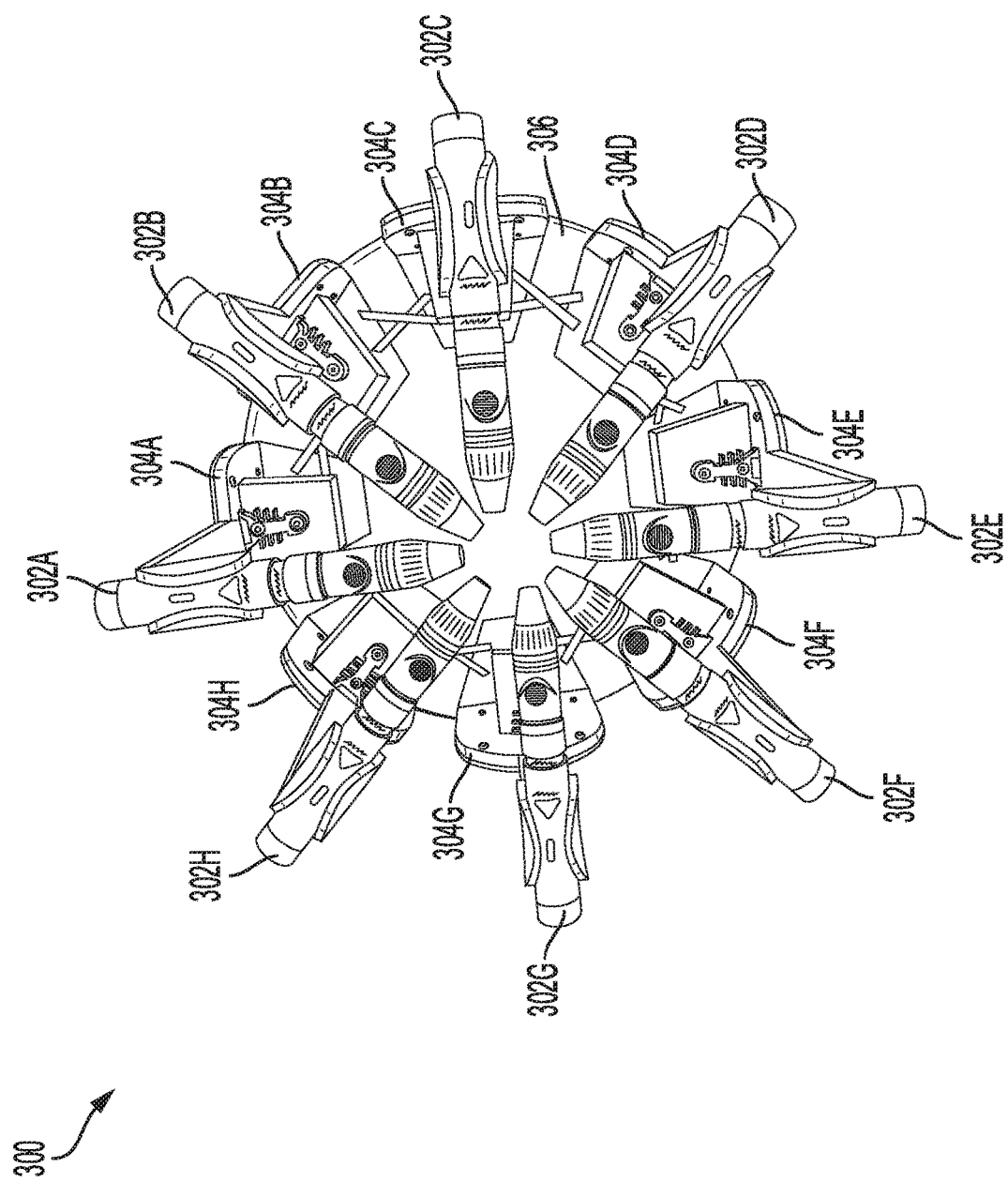
FIGS. 3A-3B illustrate transmitter/receiver array according to an exemplary embodiment of the present disclosure.
Figure 3B:
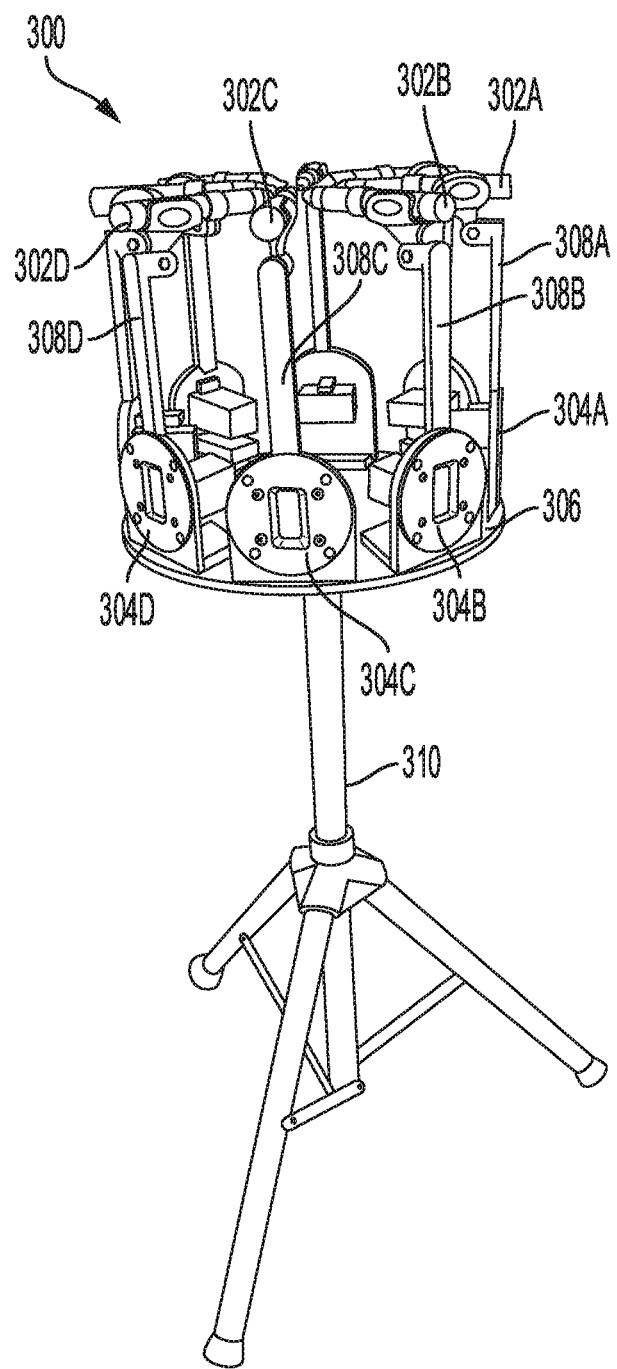

FIGS. 3A-3B illustrate a transmitter/receiver array 300 according to an exemplary embodiment of the present disclosure. The transmitter/receiver array 300 may be used to transmit and/or receive audio transmission 200. For example, the transmitter/receiver array 300 may be an exemplary implementation of at least one of the computing devices 102, 104. The transmitter/receiver array 300 includes eight receivers 302A-H and eight transmitters 304 A-H. Each of the eight receivers 302A-H may be exemplary implementations of the receivers 110, 112. For example, the eight receivers 302A-H may be implemented as microphones. Each of the eight transmitters 304A-H may be exemplary implementations of the transmitters 106, 108. For example, the eight transmitters 304A-H may be implemented as speakers.

As depicted, the receivers 302A-H and the transmitters 304A-H are arranged to evenly cover a 360° area surrounding the transmitter/receiver array 300. For example, the receivers 302A-H and transmitters 304A-H are arranged so that there is approximately 45° between adjacent receivers 302A-H and adjacent transmitters 304A-H. Such a configuration may enable the transmitter/receiver array 300 receive audio transmissions 200 from and transmit audio transmissions 200 in multiple directions within a coverage area of the transmitter/receiver array 300. For example, the transmitter/receiver array 300 may be configured to receive audio transmissions from multiple computing devices in different portions of a service area.

The receivers 302A-H and the transmitters 304A-H may be mounted on a support body 306. The support body 306 may allow the transmitter/receiver array 300 to be positioned and configured without altering the relative orientation of the receivers 302A-H and the transmitters 304A-H. In certain implementations, the receivers 302A-H may be mounted such that the receivers 302A-H are separated from the transmitters 304A-H (e.g., so that the receivers 302A-H can avoid interference from the transmitters 304A-H). For example, the receivers 302A-H may be mounted on structural members 308A-D (only a subset of which are depicted in FIG. 3B) that separate the receivers 302A-H from the transmitters 304A-H. In certain implementations, the transmitter/receiver array 300 may be mounted on a support element, such as the support element 310. The support element 310 may raise the transmitter/receiver array 300 from the ground such that the transmitter/receiver array 300 is at a height better suited to receiving and transmitting audio transmission 200 (e.g., at or between chest and waist height for a typical individual).

It should be appreciated that additional or alternative implementations of the transmitter/receiver array 300 are possible. For example, alternative implementations may have more or fewer transmitters and/or receivers and/or may have larger or smaller transmitters and/or receivers. As another example, alternative implementations may omit one or more of the support body 306, the structural members 308A-D, and/or the support elements 310. As yet another example, alternative implementations may further include a housing surrounding the transmitters 304A-H and/or receivers 302A-H.

Figure 4:
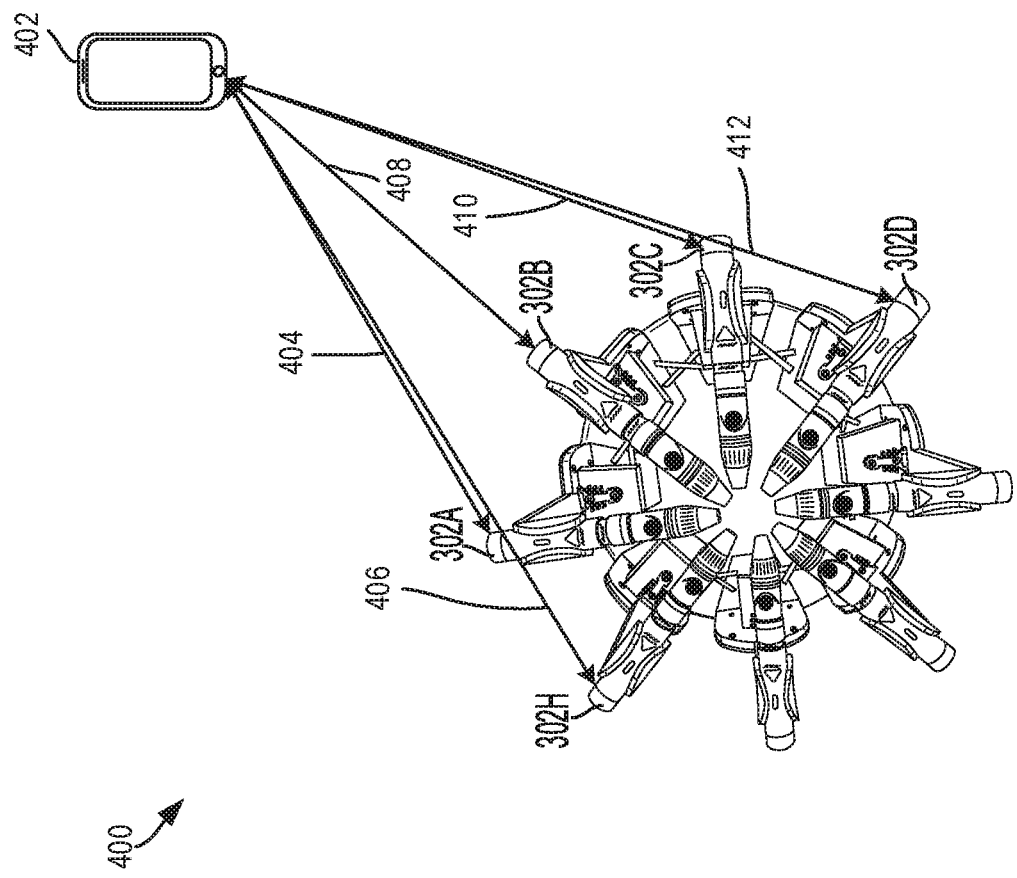
FIG. 4 illustrates a scenario according to an exemplary embodiment of the present disclosure.

FIG. 4 illustrates a scenario 400 according to an exemplary embodiment of the present disclosure. In the scenario 400, a computing device 402 is transmitting an audio transmission to the transmitter/receiver array 300. For example, the receivers 302A-D, 302H may receive the audio transmission from the computing device 402. However, due to the position of the computing device 402 relative to the transmitter/receiver array 300, the receivers 302A-D, 302H are different distances away from the computing device 402. For example, the distance 408 between the computing device 402 and the receiver 302B is shorter than the distances 404, 410 to the receivers 302A, 302C. The distances 406, 412 to the receivers 302H, 302D are even longer than the distances 404, 410. Because of these differences in distance, the receivers 302A-D, 302H may receive the audio transmission at different times.

Figure 5:
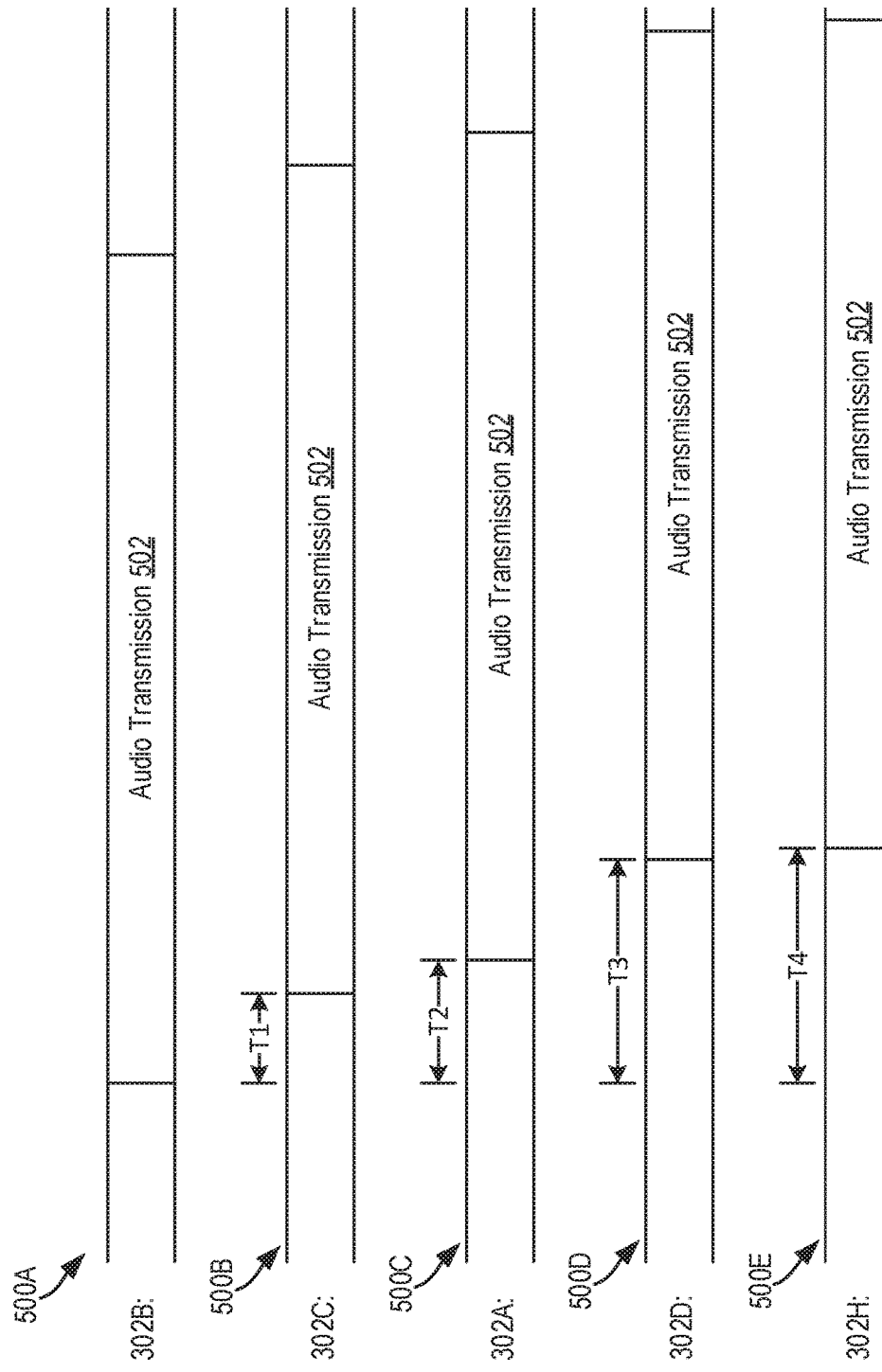
FIG. 5 illustrates received audio signals according to an exemplary embodiment of the present disclosure.

For example, FIG. 5 illustrates timing diagrams 500A-E of received audio signals according to an exemplary embodiment of the present disclosure. The timing diagrams may correspond to audio signals received by the receivers 302A-D, 302H. For example, as depicted, the timing diagram 500A may correspond to the receiver 302B, the timing diagram 500B may correspond to the receiver 302C, the timing diagram 500C may correspond to the receiver 302A, the timing diagram 500D may correspond to the receiver 302D, and the timing diagram 500E may correspond to the receiver 302H.

The timing diagrams 500A-E may depict a summary of the contents of the audio signals received by the receivers 302A-D, 302H over time. For example, the receivers 302A-D, 302H may regularly and/or constantly receive audio signals, including both audio transmissions 502 and other types of audio data (e.g., environmental noises or other noises). The audio signals may then be processed to detect audio transmissions 502 (e.g., by detecting a preamble or other portion of the audio transmission 520). Therefore, the timing diagrams 500A-E depict the time at which the audio transmission 502 (e.g., the audio transmission from the computing device 402) is detected in the audio signals received from the receivers 302A-D, 302H. In the timing diagram 500A, the audio transmission 502 is detected earliest in the audio signal from the receiver 302B. In the other timing diagrams 500B-E, the audio transmission 502 is detected at later times. In particular, the audio transmission 502 is detected in the audio stream from the receiver 302C at a time difference T1 after being detected in the audio stream from the receiver 302B. Similarly, the audio transmission 502 is detected in the audio stream from the receiver 302A at a time difference T2 after being detected in the audio stream from the receiver 302B. The audio transmission 502 is detected in the audio stream from the receiver 302D at a time difference T3 after being detected in the audio stream from the receiver 302B. Also, the audio transmission 502 is detected in the audio stream from the receiver 302H at a time difference T4 after being detected in the audio stream from the receiver 302B.

The time differences T1-T4 may depend on the difference in distance 404, 406, 408, 410, 412 between the computing device 402 and the corresponding receiver 302A-D, 302H from which an audio stream is received. For example, the receiver 302B is closest to the computing device 402 and the audio transmission 502 may therefore be detected first in the audio stream from the receiver 302B. Relatedly, the receiver 302C is the next closest receiver, so the audio transmission 502 is detected next in the audio transmission 502 at the time difference T1. Further, because the receiver 302A is closer than the receiver 302D, the time difference T2 is shorter than the time difference T3. Also, because the receiver 302D is closer than the 302H, the time difference T3 is shorter than the time difference T4.

Figure 6:
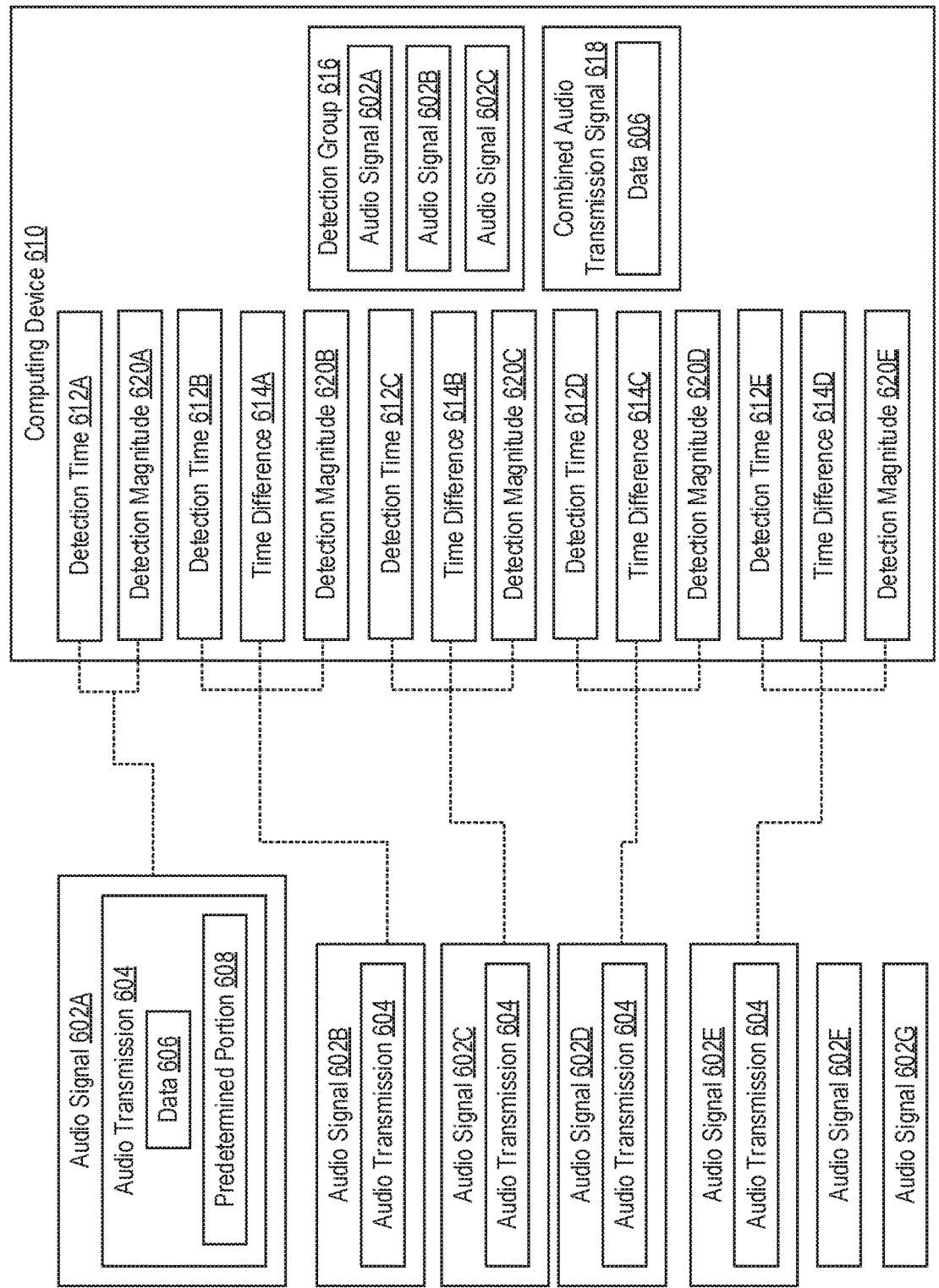
FIG. 6 illustrates a system according to an exemplary embodiment of the present disclosure.

FIG. 6 illustrates a system 600 according to an exemplary embodiment of the present disclosure. The system 600 may be configured to receive and process audio signals from multiple receivers in order to identify and combine audio signals with the strongest magnitude of an audio transmission. The system includes a computing device 610 and audio signals 602A-H. The audio signals 602A-H may originate from multiple receivers. For example, the computing device 610 may be communicatively coupled to multiple receivers, such as receivers 302A-H of the transmitter/receiver array 300 and may receive the audio signals 602A-H from the receivers 302A-H. The audio signals 602A-E contain an audio transmission 604. The audio transmission 604 may be received from another computing device, such as the computing device 402. For example, a subset of the receivers may receive the audio transmission 604, as in the scenario 400. The audio signals 602A-E originating from the subset of receivers may therefore contain the audio transmission 604. The audio transmission 604 may contain data 606 and a predetermined portion 608. For example, as discussed above in connection with the audio transmission 200, the audio transmission 604 may store data 606 in a payload 204 of the audio transmission 604, such as the packet 208. The predetermined portion 608 may correspond to a known, predetermined sequence. For example, the predetermined portion 608 may include a predetermined sequence of symbols (e.g., symbols containing a predetermined sequence of frequencies and/or phase differences). The predetermined portion 608 may identify the audio transmission 604 to the computing device 610. For example, the predetermined portion 608 may correspond to a preamble of the audio transmission 604, such as the preamble 202. The computing device 610 may therefore receive the audio signals 602A-H and may analyze the audio signals 602A-H for the predetermined portion 608. For example, the computing device 610 may, on an ongoing basis, compare a portion (e.g., a rolling buffer) of the incoming audio signals 602A-H to an expected sequence of audio that corresponds to the predetermined portion 608. In particular, the computing device 610 may using a match filter to compare a moving average of the incoming audio signals 602A-H to the expected sequence of audio and may compute a match magnitude indicating a magnitude or proportion of the moving average that matches the expected sequence of audio. In such implementations, the computing device 610 may determine that the audio signal 602A-E includes the predetermined portion 608 if the match magnitude exceeds a predetermined threshold. Upon detecting the predetermined portion 608 in one of the audio signals 602A-E, the computing device 610 may determine that the audio signal 602A-E includes an audio transmission 604.

The computing device 610 may determine a detection time 612A-E for each audio signal 602A-E in which an audio transmission 604 is detected. The detection time 612A-E may indicate the time at which the detected audio transmission 604 was received by a receiver corresponding to the audio signal 602A-E in which the audio transmission 604 was received. For example, the detection time 612A-E may be determined as the starting time of the audio transmission 604 in each of the audio signals 602A-E. As explained above, depending on the relative positioning of the receivers corresponding to the audio signals 602A-E, the detection times 612A-E of the audio transmission 604 may differ for the audio signals 602A-E. The computing device 610 may compute time differences 614A-D for at least a subset of the audio signals 602A-E in which the audio transmission 604 is detected. For example, the detection time 612A may indicate that the audio transmission 604 was detected in the audio signal 602A earlier than being detected in the audio signals 602B-E. The computing device 610 may therefore calculate time differences 614A-D for the audio signals 602B-E with later detection times 612B-E. For example, as discussed above in connection with FIG. 4, the time differences 614A-D may be calculated as the difference between the earliest detection time 612A of the audio transmission 604 and the later detection times 612B-E corresponding to the audio signals 602B-E. As a specific example, the time difference 614A associated with the audio signal 602B may be calculated as the difference between the detection time 612A and the detection time 612B. Similarly, the time difference 614B associated with the audio signal 602C may be calculated as the difference between the detection time 612A and the detection time 612C. The time difference 614C associated with the audio signal 602D may be calculated as the difference between the detection time 612A and the detection time 612D. Further, the time difference 614D associated with the audio signal 602E may be calculated as the difference between the detection time 612A and the detection time 612E.

The computing device 610 may also determine detection magnitudes 620A-E for the audio signals 602A-E in which the audio transmission 604 is detected. The detection magnitudes 620A-E may measure a magnitude of the audio transmission 604 within the audio signal 602A-E. For example, the detection magnitudes 620A-E may measure a predicted or expected magnitude of the audio transmission 604 within the audio signals 602A-E. As explained above, in certain implementations, the computing device 610 may detect the predetermined portion 608 by calculating a match magnitude for the audio signals 602A-E. In such implementations, the detection magnitude 620A-E may be determined as the match magnitude for the corresponding audio signal 602A-E (e.g., a maximum magnitude of the match magnitude). In additional or alternative implementations, the detection magnitude 620A-E may be determined using other magnitude measure, such as a signal-to-noise ratio for the audio transmission 604 in the audio signals 602A-E and a root-mean-square magnitude of the portions of the audio signals 602A-E that contain the audio transmission.

The computing device 610 may be configured to identify a detection group 616 that includes the audio signals 602A-C with the strongest magnitude of the audio transmission 604. In certain implementations, the detection magnitudes 620A-E may be utilized to identify the audio signals 602A-C included in the detection group 616. For example, the audio signals 602A-C included in the detection group 616 may be identified as the audio signals 602A-C with a detection magnitude 620A-C that exceeds a certain, predetermined threshold. As another example, the computing device 610 may identify the audio signal containing the largest magnitude of the audio transmission and may identify the second subset of the audio signals as the audio signal containing the largest magnitude of the audio transmission and any audio signals containing magnitudes of the audio transmission that exceed the predetermined threshold (e.g., 50%, 80%, 90% of the largest magnitude of the audio transmission). In additional or alternative implementations, the audio signals with the strongest magnitude may be identified as a predetermined number of audio signals (e.g., one audio signal, three audio signals, five audio signals) with the largest detection magnitudes 620A-C. As a specific example, the detection magnitudes 620A-C may exceed the predetermined threshold and the audio signals 602A-C may therefore be included within the detection group 616.

In additional or alternative implementations, the time differences 614A-D may be utilized to identify the audio signals 602A-C included within the detection group 616. For example, the audio signals 602A-C included in the detection group 616 may be identified as receivers associated with a time difference 614A-D below a predetermined threshold. The predetermined threshold may be selected to ensure that only receivers located closely together are identified as the audio signals 602A-C with the largest magnitude of the audio transmission 604 and/or to ensure that audio signals including other audio transmissions or reflections of the audio transmission 640 are not included. For example, the predetermined threshold may be selected to be 40 ms, although other implementations are possible (e.g., 20 ms, 50 ms, 100 ms). As a specific example, the audio signals 602A-E may, in certain instances, each have detection magnitudes 620A-E that exceed the predetermined threshold for detection magnitudes. However, the audio signal 602A may have the earliest detection time 612A and the time differences 614A-B for the audio signals 602B-C may be below the predetermined threshold for time differences, while the time differences 614C-D for the audio signals 602D-E may be above the predetermined threshold for time differences. Accordingly, the audio signals 602A-C may be included within the detection group 616 and the audio signals 602D-E may be excluded from the detection group 616.

In certain implementations, the predetermined threshold may be adjusted to account for current operating conditions of the receivers and/or the computing device 610. For example, if the computing device 610 detects that the receivers are receiving many audio transmissions on a particular carrier channel in addition to the audio transmission 604, the predetermined threshold may be lowered to reduce the number of receivers identified as closest to the source. Such a reduction in the predetermined threshold may allow for other receivers to receive additional audio transmissions on the particular carrier channel without affecting the subsequent processing of the audio transmission 604. Additionally, a shorter predetermined threshold may help prevent later occurrences of the same audio transmission (e.g., reflections of the audio transmission 604) from being identified.

At least a portion of the audio signals 602A-C included in the detection group 616 may be combined to generate the combined audio transmission signal 618. At least a portion of the audio signals 602A-C may then be combined to generate the combined audio transmission signal 618. In such examples, the portions of the audio signals 602A-C containing at least a portion of the audio transmission 604 may be combined to generate the combined audio transmission signal 618. In certain implementations, the computing device 610 may combine the portions of the audio signals 602A-C containing the data 606 of the audio transmission 604. In further implementations, the computing device 610 may combine the portions of the audio signal 602A-C associated with additional or alternative parts of the audio transmission 604 (e.g., the predetermined portion 608 of the audio transmission 604, a header of the audio transmission 604, and/or the entire audio transmission 604). The combined audio transmission signal 618 may then be utilized for further processing of the audio transmission 604, such as demodulation and/or extraction and processing of the data 606.

The computing device 610 may be implemented by a computing system. For example, although not depicted, the computing device 610 may contain a processor and a memory that implement at least one operational feature. For example, the memory may contain instructions which, when executed by the processor, cause the processor to implement at least one operational feature of the computing device 610.

Figure 7:
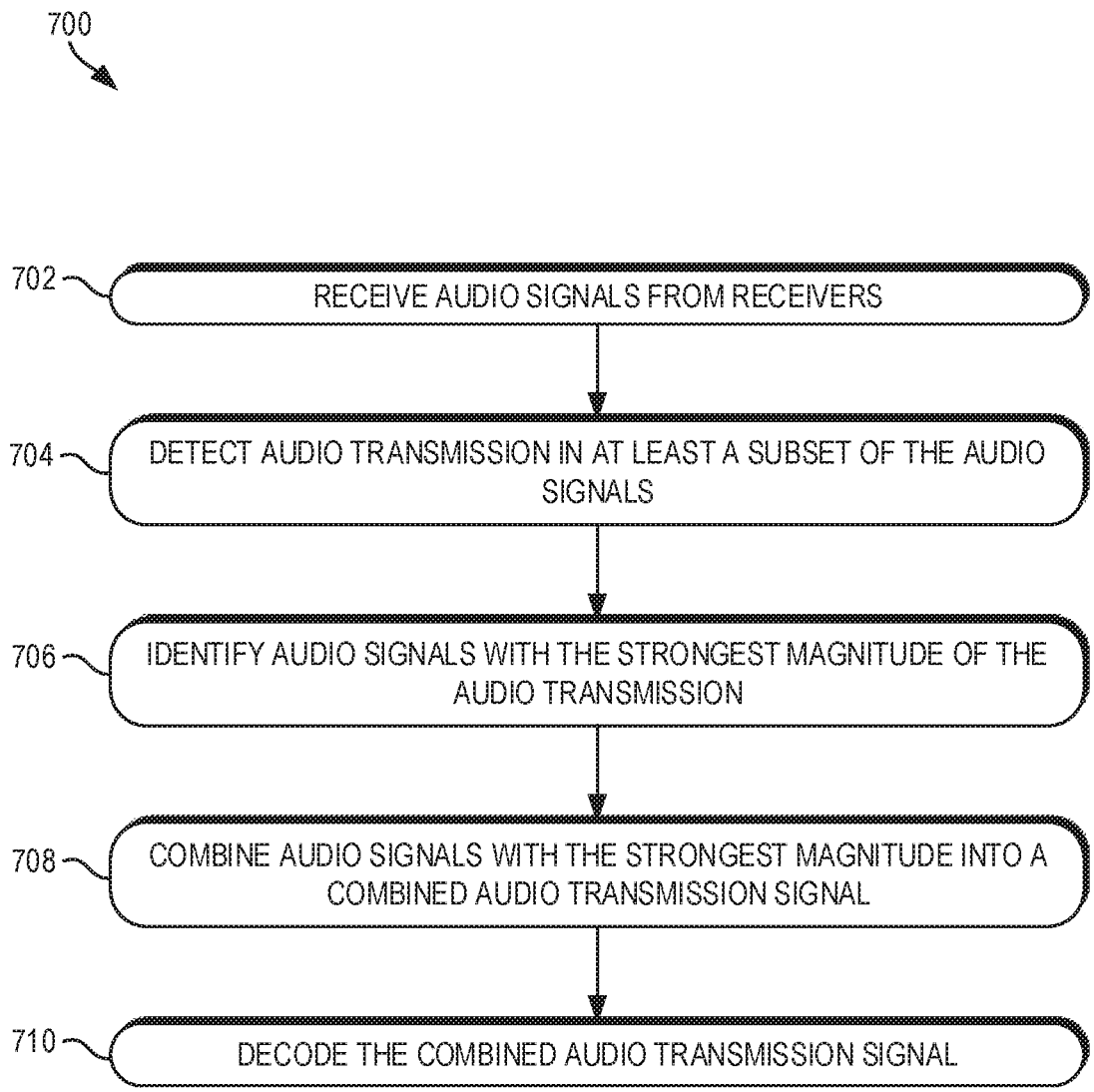
FIG. 7 illustrates a method according to an exemplary embodiment of the present disclosure.

FIG. 7 illustrates a method 700 according to an exemplary embodiment of the present disclosure. The method 700 may be performed to receive and process audio signals from multiple receivers where at least a subset of the audio signals contain an audio transmission. The method 700 may be performed by a computer system, such as the system 600. For example, the method 700 may be implemented by the computing device 610. The method 700 may also be implemented by a set of instructions stored on a computer readable medium that, when executed by a processor, cause the processor to perform the method. For example, all or part of the method 700 may be implemented by a processor and/or a memory of the computing device 610. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with receiving audio signals from receivers (block 702). For example, the computing device 610 may receive multiple audio signals 602A-H from multiple receivers. The receivers may be oriented in multiple directions, such as the receivers 302A-H of the transmitter/receiver array 300. In still further implementations, the receivers may be located in multiple locations (e.g., multiple locations within a service area).

An audio transmission may then be detected in at least a subset of the audio signals (block 704). For example, the computing device 610 may detect an audio transmission 604 in at least a subset of the audio signals 602A-E. In implementations where the audio signals 602A-E are received from multiple receivers, a subset of the receivers may receive an audio transmission 604 from a source, such as the computing device 402. The computing device 610 may therefore detect the audio transmission 604 in the subset of the audio signals 602A-E from the subset of receivers that received the audio transmission 604. As explained above, the computing device 610 may detect the audio transmission 604 in the subset of the audio signals 602A-E by detecting a predetermined portion 608 of the audio transmission 604, such as a preamble of the audio transmission 604. For example, the predetermined portion 608 may correspond to an expected sequence of symbols within the audio transmission 604 and the computing device 610 may compare the audio signals 602A-H (e.g., a moving average of samples of symbols from the audio signals 602A-H) with the expected sequence of symbols using a match filter to determine a match magnitude for the audio signals 602A-H. The computing device 610 may detect the predetermined portion 608 within the audio signals 602A-E as a portion of the audio signals 602A-E that matches the expected sequence of symbols (e.g., a portion of the audio signals 602A-E that corresponds to a maximum value of the match magnitude that exceeds a predetermined threshold). Upon detecting the predetermined portion 608 in a subset of the audio signals 602A-E, the computing device 610 may determine that the subset of the audio signals 602A-E contain the audio transmission 604.

Audio signals with the strongest magnitude of the audio transmission may then be identified (block 706). For example, the computing device 610 may identify a detection group 616 of audio signals 602A-C that have the strongest magnitude of the audio transmission 604. The computing device 610 may identify the audio signals 602A-C included within the detection group 616 based on detection magnitudes 620A-E and/or detection times 612A-E associated with the audio signals 602A-E in which an audio transmission 604 is detected. Identifying the audio signals 602A-C with the strongest magnitude is discussed further below in connection with FIG. 8 and the method 800.

The audio signals with the strongest magnitude of the audio transmission may then be combined into a combined audio transmission signal (block 708). For example, the computing device 610 may combine the audio signals 602A-C with the strongest magnitude of the audio transmission to generate the combined audio transmission signal 618. To combine the audio signals 602A-C, the computing device 610 may align the portions of the audio signals 602A-C containing at least a portion of the audio transmission 604. For example, the audio signals 602A-C may be aligned according to the detection time 612A-C of the audio transmission 604 within the audio signal 602A-C (e.g., such that the detection times align). The computing device may then add the audio signals 602A-C together to form the combined audio transmission signal 618. In certain implementations, the computing device 610 may add together all portions of the audio signals 602A-C corresponding to the audio transmission 604. In additional or alternative implementations, the computing device 610 may add together a subset of the audio signals that correspond the audio transmission 604 (e.g., the portions of the audio signal corresponding to the data 606 within the audio transmission 604). In certain implementations, the audio signals 602A-C with the strongest magnitude of the audio transmission may be normalized prior to being combined into the combined audio transmission signal 618. For example, the computing device 610 may normalize each audio signal 602A-C based on a corresponding maximum magnitude of the match filter for the audio signal 602A-C. In particular, the computing device 610 may divide the magnitude of the audio signals 602A-C by the corresponding maximum magnitude to normalize the audio signals 602A-C. The computing device 610 may then add the audio signals that have been normalized together to generate the combined audio transmission signal 618.

The combined audio transmission signal 618 may then be decoded (block 710). For example, the computing device 610 may decode the symbols to extract information from the combined audio transmission signal 618 regarding the audio transmission 604. In certain implementations, the combined audio transmission signal 618 may be decoded by decoding the symbols of all or part of the combined audio transmission 618. For example, at least the portion of the combined audio transmission signal 618 corresponding to the data 606 may be decoded to extract the data 606 from the audio transmission 604. By combining the audio signals from multiple receivers into the combined audio transmission signal 618 before decoding the audio transmission 604, the accuracy of the decoded information may be improved. For example, combining multiple audio signals containing the audio transmission may improve the signal-to-noise ratio of the combined audio transmission signal 618 as compared to the audio transmission 604 in the audio signals 602A-E because the contents of the audio transmission may correlate more strongly between the audio signals 602A-E than the sources of interference or other disturbances correlate between the audio signals 602A-E. Therefore, adding the audio signals may increase the relative magnitude of the audio transmission 604 within the combined audio transmission signal 618 while decreasing the relative magnitude of the interference and/or disturbances. In this way, the method 700 may improve the accuracy of the combined audio transmission signal 618, thereby improving the accuracy of the data 606 extracted from the combined audio transmission signal 618. Furthermore, by only combining the audio signals 602A-C with the strongest magnitude of the audio transmission 604, the computing device 610 may additionally improve the signal-to-noise ratio of the combined audio transmission signal 618. For example, audio signals with lower magnitudes of the audio transmission 604 may be more likely to include interference and/or disturbances, which would reduce the signal-to-noise ratio of the combined audio transmission signal 618. Additionally, receivers with lower magnitudes of the audio transmission 604 may be more likely to receive other audio transmissions (e.g., audio transmissions from other sources), which may further reduce the signal-to-noise ratio of the combined audio transmission signal 618.

Further, the method 700 may be repeated to process multiple audio transmissions, including multiple transmissions received at the same or similar times. For example, a first audio transmission may be received by a first set of receivers 302A-D, 302H from a source located closest to the receiver 302B and a second audio transmission may be received by a second set of receivers 302D-H from a source located closest to the receiver 302F. The first and second audio transmissions may be received at the same or similar times (e.g., within 1 second, 0.5 seconds, 0.1 seconds, 50 ms of one another). In such instances, the method 700 may be performed once for each of the first and second audio transmissions. Where the first and second audio transmissions are received from different directions, as in the preceding example, the audio signals with the strongest magnitude of the first audio transmission may differ from the audio signals with the strongest magnitude of the second audio transmission. For example, the method 700 may be performed to process the first audio transmission to identify the audio signals 602A-C as the audio signals with the strongest magnitude of the first audio transmission and may be performed to process the second audio transmission to identify audio signals 602E-G as the audio signals with the strongest magnitude of the second audio transmission. In this way, the method 700 may enable the computing device 610 to distinguish between multiple audio transmissions that are received at same or similar times by transmitter/receiver arrays (e.g., the transmitter/receiver array 300). In particular, because the audio signals with the strongest magnitude of the first audio transmission differ from the audio signals with the strongest magnitude of the second audio transmission, the combined audio signals for each set of audio signals will contain a more accurate copy of the corresponding first or second audio transmission, without incorporating audio signals from receivers that are too close to the source of the other audio transmission. The processing capabilities of the computing device 610 and the overall communication capacities of systems that utilize audio transmission may therefore be improved because multiple audio transmissions may be received along the same channel as a result of the improved directional processing of received audio transmissions enabled by the method 700.

Figure 8:
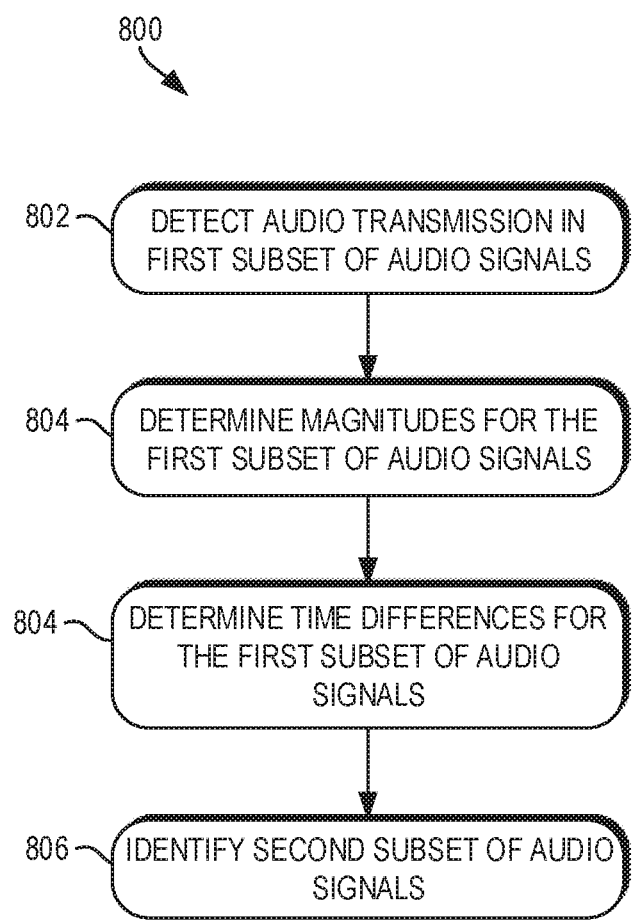
FIG. 8 illustrates a method according to an exemplary embodiment of the present disclosure.

FIG. 8 illustrates a method 800 according to an exemplary embodiment of the present disclosure. The method 800 may be performed to identify audio signals with the strongest magnitude of an audio transmission. For example, the method 800 may be performed to implement all or part of blocks 704 and/or 706 of the method 700. The method 800 may be implemented on a computer system, such as the computing device 610. The method 800 may also be implemented by a set of instructions stored on a computer readable medium that, when executed by a processor, cause the processor to perform the method 800. For example, all or part of the method 800 implemented by a processor and/or memory contained within the computing device 610. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 may begin with detecting and audio transmission in a first subset of audio signals (block 802). For example, and as discussed further above in connection with the method 700 and FIG. 6, the computing device 610 may detect the audio transmission 604 in a first subset of audio signals 602A-E. In certain implementations, the computing device 610 may detect the audio transmission 604 by detecting a predetermined portion 608 of the audio transmission 604 in the first subset of audio signals 602A-E.

Magnitudes may be determined for the first subset of audio signals (block 804). For example, the computing device 610 may determine a detection magnitude 620A-E for each of the first subset of audio signals 602A-E. As explained above, in certain implementations, the detection magnitudes 620A-E may be determined as a peak value for a match filter comparing the predetermined portion 608 of the audio transmission 604 with an expected sequence of symbols.

Time differences may be determined for the first subset of audio signals (block 806). For example, the computing device 610 may determine a detection time 612A-E for each of the first subset of audio signals 602A-E. The detection time 612A-E for each of the first subset of audio signals 602A-E may indicate a time at which the audio transmission 604 is detected in the audio signal 602A-E, as discussed above. Based on the detection times 612A-E, the computing device 610 may calculate time differences 614A-D for the audio signals 602A-E. For example, the computing device 610 may identify an earliest detection time for one of the audio signals (e.g., the detection time 612A of the audio signal 602A) and may calculate the time differences 614A-D as the difference between the detection times 612B-E and the earliest detection time 612A.

A second subset of audio signals may then be identified (block 808). For example, the computing device 610 may identify the second subset of audio signals for inclusion within the detection group 616. In particular, the computing device 610 may identify the second subset of the audio signals as the audio signals from the first subset of the audio signals with the largest magnitude of the audio transmission 604. For example, and as explained above, the second subset of the audio signals may be identified as the audio signals 602A-C with a corresponding detection magnitude 620A-C that exceeds a predetermined threshold. In another example, the computing device 610 may additionally or alternatively identify the second subset of the audio signals based at least in part on the time differences 614A-D. For example, and as discussed above, the computing device 610 may identify the second subset of the audio signals as the audio signals with a time difference less than a predetermined threshold (e.g., 40 ms). For example, in FIG. 5, the time difference T1 may be 20 ms, the time difference T2 may be 25 ms, the time difference T3 may be 45 ms, and the time difference T4 may be 47 ms. The computing device 610 may identify the audio signals from the receivers 302C, 302A as part of the second subset of the audio signals because the time differences T1, T3 are less than the predetermined threshold of 40 ms, but may not identify the audio signals from the receivers 302D, 302H as part of the second subset of the audio signals because the time differences T3, T4 are greater than the predetermined threshold of 40 ms. Similarly, the audio signal from the receiver 302B may be identified as part of the second subset of audio signals because the audio transmission 502 is detected earliest in the audio signal from the receiver 302B. By performing the method 800, the computing device 610 may be able to accurately identify the audio signals with the strongest magnitude of the audio transmission. As explained above in connection with the method 700, the second subset of audio signals may then be combined to generate the combined audio transmission signal 618. By accurately identifying audio signals with the strongest magnitude of the audio transmission, the method 800 improves the accuracy of the combined audio transmission signal 618 and thereby improve the accuracy of subsequent processing of the audio transmission 604. Additionally, utilizing time differences to identify the audio signals with the strongest magnitude of the audio transmission may reduce the likelihood that audio signals containing different audio transmission are identified. For example, certain received audio transmissions may have the same or similar predetermined portion and may therefore have similar detection magnitudes in different audio signals. Accordingly, relying solely on detection magnitudes to identify the detection group may result in audio signals including a first audio transmission to be combined with audio signals containing a second audio transmission. However, the audio transmissions may be less likely to have similar detection times. Therefore, utilizing time differences may help distinguish between audio signals containing each audio transmission, reducing the likelihood that audio signals containing the second transmission are included within the detection group for the first audio transmission, and vice-versa.

FIG. 9 illustrates an example computer system 900 that may be utilized to implement one or more of the devices and/or components of FIG. 1, such as the computing devices 102, 104, 602. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates the computer system 900 taking any suitable physical form. As example and not by way of limitation, the computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 906, memory 904, storage 908, an input/output (I/O) interface 910, and a communication interface 912. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 906 includes hardware for executing instructions, such as those making up a computer program. As an example and not by way of limitation, to execute instructions, the processor 906 may retrieve (or fetch) the instructions from an internal register, an internal cache, memory 904, or storage 908; decode and execute the instructions; and then write one or more results to an internal register, internal cache, memory 904, or storage 908. In particular embodiments, the processor 906 may include one or more internal caches for data, instructions, or addresses. This disclosure contemplates the processor 906 including any suitable number of any suitable internal caches, where appropriate. As an example and not by way of limitation, the processor 906 may include one or more instruction caches, one or more data caches, and one or more translation lookaside buffers (TLBs). Instructions in the instruction caches may be copies of instructions in memory 904 or storage 908, and the instruction caches may speed up retrieval of those instructions by the processor 906. Data in the data caches may be copies of data in memory 904 or storage 908 that are to be operated on by computer instructions; the results of previous instructions executed by the processor 906 that are accessible to subsequent instructions or for writing to memory 904 or storage 908; or any other suitable data. The data caches may speed up read or write operations by the processor 906. The TLBs may speed up virtual-address translation for the processor 906. In particular embodiments, processor 906 may include one or more internal registers for data, instructions, or addresses. This disclosure contemplates the processor 906 including any suitable number of any suitable internal registers, where appropriate. Where appropriate, the processor 906 may include one or more arithmetic logic units (ALUs), be a multi-core processor, or include one or more processors 906. Although this disclosure describes and illustrates a particular processor, this disclosure contemplates any suitable processor.

In particular embodiments, the memory 904 includes main memory for storing instructions for the processor 906 to execute or data for processor 906 to operate on. As an example, and not by way of limitation, computer system 900 may load instructions from storage 908 or another source (such as another computer system 900) to the memory 904. The processor 906 may then load the instructions from the memory 904 to an internal register or internal cache. To execute the instructions, the processor 906 may retrieve the instructions from the internal register or internal cache and decode them. During or after execution of the instructions, the processor 906 may write one or more results (which may be intermediate or final results) to the internal register or internal cache. The processor 906 may then write one or more of those results to the memory 904. In particular embodiments, the processor 906 executes only instructions in one or more internal registers or internal caches or in memory 904 (as opposed to storage 908 or elsewhere) and operates only on data in one or more internal registers or internal caches or in memory 904 (as opposed to storage 908 or elsewhere). One or more memory buses (which may each include an address bus and a data bus) may couple the processor 906 to the memory 904. The bus may include one or more memory buses, as described in further detail below. In particular embodiments, one or more memory management units (MMUs) reside between the processor 906 and memory 904 and facilitate accesses to the memory 904 requested by the processor 906. In particular embodiments, the memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory implementations, this disclosure contemplates any suitable memory implementation.

In particular embodiments, the storage 908 includes mass storage for data or instructions. As an example and not by way of limitation, the storage 908 may include a hard disk drive (HDD), a floppy disk drive, flash memory, an optical disc, a magneto-optical disc, magnetic tape, or a Universal Serial Bus (USB) drive or a combination of two or more of these. The storage 908 may include removable or non-removable (or fixed) media, where appropriate. The storage 908 may be internal or external to computer system 900, where appropriate. In particular embodiments, the storage 908 is non-volatile, solid-state memory. In particular embodiments, the storage 908 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 908 taking any suitable physical form. The storage 908 may include one or more storage control units facilitating communication between processor 906 and storage 908, where appropriate. Where appropriate, the storage 908 may include one or more storages 908. Although this disclosure describes and illustrates particular storage, this disclosure contemplates any suitable storage.

In particular embodiments, the I/O Interface 910 includes hardware, software, or both, providing one or more interfaces for communication between computer system 900 and one or more I/O devices. The computer system 900 may include one or more of these I/O devices, where appropriate. One or more of these I/O devices may enable communication between a person (i.e., a user) and computer system 900. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 910 may include one or more device or software drivers enabling processor 906 to drive one or more of these I/O devices. The I/O interface 910 may include one or more I/O interfaces 910, where appropriate. Although this disclosure describes and illustrates a particular I/O interface, this disclosure contemplates any suitable I/O interface or combination of I/O interfaces.

In particular embodiments, communication interface 912 includes hardware, software, or both providing one or more interfaces for communication (such as, for example, packet-based communication) between computer system 900 and one or more other computer systems 900 or one or more networks 914. As an example and not by way of limitation, communication interface 912 may include a network interface controller (NIC) or network adapter for communicating with an Ethernet or any other wire-based network or a wireless NIC (WNIC) or wireless adapter for communicating with a wireless network, such as a W-Fi network. This disclosure contemplates any suitable network 914 and any suitable communication interface 912 for the network 914. As an example and not by way of limitation, the network 914 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 912 for any of these networks, where appropriate. Communication interface 912 may include one or more communication interfaces 912, where appropriate. Although this disclosure describes and illustrates a particular communication interface implementations, this disclosure contemplates any suitable communication interface implementation.

The computer system 902 may also include a bus. The bus may include hardware, software, or both and may communicatively couple the components of the computer system 900 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
    receiving multiple audio signals detected by multiple receivers;
    detecting a first audio transmission in a first subset of the multiple audio signals, the first subset of the multiple audio signals being received by a first subset of the multiple receivers;
    identifying a second subset of the multiple audio signals that correspond to a second subset of the multiple receivers with strongest magnitudes of the first audio transmission;
    combining portions of the second subset of the multiple audio signals corresponding to at least a first portion of the first audio transmission to generate a first combined audio transmission signal; and
    decoding the at least a portion of the first combined audio transmission signal to extract first data.

2. The method of claim 1, further comprising:
    detecting a second audio transmission in a third subset of the multiple audio signals, the third subset of the multiple audio signals being received by a third subset of the multiple receivers;
    identifying a fourth subset of the multiple audio signals corresponding to a fourth subset of the multiple receivers with strongest magnitudes of the second audio transmission;
    combining portions of the fourth subset of the multiple audio signals corresponding to at least a first portion of the second audio transmission to generate a second combined audio transmission signal; and
    decoding the at least a portion of the second combined audio transmission signal to extract second data different from the first data.

3. The method of claim 2, wherein the second audio transmission is detected within one second of detecting the first audio transmission.

4. The method of claim 2, wherein the first audio transmission and the second audio transmission are transmitted using the same audio carrier channel.

5. The method of claim 2, wherein the fourth subset of the multiple receivers does not include any of the second subset of the multiple receivers.

6. The method of claim 1, wherein identifying the second subset of the multiple audio signals further comprises:
    determining, among the first subset of the multiple audio signals, an earliest detection time of the first audio transmission;
    determining, for each respective audio signal of the first subset of the multiple audio signals, a respective time difference between the earliest detection time and when the first audio transmission is detected in the respective audio signal; and
    identifying the second subset of the multiple audio signals as comprising audio signals of the first subset of the multiple audio signals with the shortest time differences.

7. The method of claim 6, wherein combining the portions of the second subset of the multiple audio signals comprises adjusting timing information of each respective audio signal of the second subset of the multiple audio signals based on the respective time difference of the audio signal.

8. The method of claim 6, wherein the second subset of the multiple audio signals are identified as the audio signals of the first subset of the multiple audio signals with respective time differences less than a predetermined threshold.

9. The method of claim 8, wherein the predetermined threshold is less than or equal to 50 milliseconds.

10. The method of claim 1, wherein combining the portions of the second subset of the multiple audio signals further comprises identifying, for each respective audio signal of the second subset of the multiple audio signals, the portion of the respective audio signal corresponding to the first portion of the first audio transmission.

11. The method of claim 1, wherein detecting the first audio transmission in the first subset of the multiple audio signals comprises detecting a second portion of the first audio transmission in the first subset of the multiple audio signals, the first portion of the first audio transmission including a predetermined audio sequence.

12. The method of claim 11, wherein the second portion of the first audio transmission is a preamble indicating the start of the first audio transmission.

13. A system comprising:
a processor; and
a memory storing instructions which, when executed by the processor, cause the processor to:
receive multiple audio signals detected by multiple receivers;
detect a first audio transmission in a first subset of the multiple audio signals, the first subset of the multiple audio signals being received by a first subset of the multiple receivers;
identify a second subset of the multiple audio signals that correspond to a second subset of the multiple receivers with strongest magnitudes of the first audio transmission;
combine portions of the second subset of the multiple audio signals corresponding to at least a first portion of the first audio transmission to generate a first combined audio transmission signal; and
decode the at least a portion of the first combined audio transmission signal to extract first data.

14. The system of claim 13, wherein the memory stores further instructions which, when executed by the processor, cause the processor to:
detect a second audio transmission in a third subset of the multiple audio signals, the third subset of the multiple audio signals being received by a third subset of the multiple receivers;
identify a fourth subset of the multiple audio signals corresponding to a fourth subset of the multiple receivers with strongest magnitudes of the second audio transmission;
combine portions of the fourth subset of the multiple audio signals corresponding to at least a first portion of the second audio transmission to generate a second combined audio transmission signal; and
decode the at least a portion of the second combined audio transmission signal to extract second data different from the first data.

15. The system of claim 14, wherein the first audio transmission and the second audio transmission are transmitted using the same audio carrier channel.

16. The system of claim 14, wherein the fourth subset of the multiple receivers does not include any of the second subset of the multiple receivers.

17. The system of claim 13, wherein the memory stores further instructions which, when executed by the processor while identifying the second subset of the multiple audio signals, cause the processor to:
determine, among the first subset of the multiple audio signals, an earliest detection time of the first audio transmission;
determine, for each respective audio signal of the first subset of the multiple audio signals, a respective time difference between the earliest detection time and when the first audio transmission is detected in the respective audio signal; and
identify the second subset of the multiple audio signals as comprising audio signals of the first subset of the multiple audio signals with the shortest time differences.

18. The system of claim 17, wherein the second subset of the multiple audio signals are identified as the audio signals of the first subset of the multiple audio signals with respective time differences less than a predetermined threshold.

19. The system of claim 13, wherein the memory stores further instructions which, when executed by the processor while combining the portions of the second subset of the multiple audio signals, cause the processor to:
identify, for each respective audio signal of the second subset of the multiple audio signals, the portion of the respective audio signal corresponding to the first portion of the first audio transmission.

20. A non-transitory, computer-readable medium storing instructions which, when executed by a processor, cause the processor to:
receive multiple audio signals detected by multiple receivers;
detect a first audio transmission in a first subset of the multiple audio signals, the first subset of the multiple audio signals being received by a first subset of the multiple receivers;
identify a second subset of the multiple audio signals that correspond to a second subset of the multiple receivers with strongest magnitudes of the first audio transmission;
combine portions of the second subset of the multiple audio signals corresponding to at least a first portion of the first audio transmission to generate a first combined audio transmission signal; and
decode the at least a portion of the first combined audio transmission signal to extract first data.

* * * * *